United States Patent
Ee et al.

(10) Patent No.: US 11,948,610 B2
(45) Date of Patent: Apr. 2, 2024

(54) ACTUATOR JOINT WITH NON-STRAIGHT EDGE

(71) Applicant: Magnecomp Corporation, Murrieta, CA (US)

(72) Inventors: Kuen Chee Ee, Chino, CA (US); Ekaratch Pankaew, Wangnoi (TH); Preecha Sudachun, Wangnoi (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 17/945,813

(22) Filed: Sep. 15, 2022

(65) Prior Publication Data

US 2023/0015787 A1    Jan. 19, 2023

Related U.S. Application Data

(63) Continuation of application No. 17/320,038, filed on May 13, 2021, now Pat. No. 11,501,797.

(60) Provisional application No. 63/025,788, filed on May 15, 2020.

(51) Int. Cl.
    *G11B 5/48*    (2006.01)

(52) U.S. Cl.
    CPC .......... *G11B 5/4826* (2013.01); *G11B 5/4833* (2013.01); *G11B 5/484* (2013.01)

(58) Field of Classification Search
    CPC .... G11B 5/4826; G11B 5/4833; G11B 5/4873
    See application file for complete search history.

(56) References Cited

U.S. PATENT DOCUMENTS

| | | |
|---|---|---|
| 6,157,522 A | 12/2000 | Murphy |
| 6,233,124 B1 | 5/2001 | Budde et al. |
| 7,023,667 B2 | 4/2006 | Shum |
| 7,177,119 B1 | 2/2007 | Bennin et al. |
| 8,149,545 B1 | 4/2012 | Chai et al. |

(Continued)

FOREIGN PATENT DOCUMENTS

| | | |
|---|---|---|
| JP | 2010-287262 A | 12/2010 |
| JP | 2016-186834 A | 10/2016 |
| JP | 2019-133731 A | 8/2019 |

OTHER PUBLICATIONS

International Search Report and Written Opinion in International Application No. PCT/US2021/032590, dated Sep. 29, 2021.

(Continued)

*Primary Examiner* — Brian E Miller
(74) *Attorney, Agent, or Firm* — DLA Piper LLP (US)

(57) ABSTRACT

A suspension is described. The suspension includes a base plate and a load beam coupled to the base plate. The base plate includes a distal elongated element and a proximal elongated element. The distal elongated element includes at least one non-straight baseplate edge and the proximal elongated element includes at least one non-straight baseplate edge. The load beam includes a first mounting shelf and a second mounting shelf. The load beam is coupled to the base plate such that the first mounting shelf is exposed adjacent to the distal elongated element, and the second mounting shelf is exposed adjacent to the proximal elongated element. The first and second mounting shelves are configured to receive an actuator, such that an edge of the actuator and the at least one non-straight baseplate edge forms a gap.

7 Claims, 5 Drawing Sheets

(56) References Cited

U.S. PATENT DOCUMENTS

| | | |
|---|---|---|
| 8,228,642 B1 | 7/2012 | Hahn et al. |
| 8,248,083 B2 | 8/2012 | Inoue et al. |
| 8,248,735 B2 | 8/2012 | Fujimoto et al. |
| 8,254,062 B2 | 8/2012 | Greminger |
| 8,498,082 B1 | 7/2013 | Padeski et al. |
| 8,526,142 B1 | 9/2013 | Dejkoonmak et al. |
| 8,570,688 B1 | 10/2013 | Hahn et al. |
| 8,699,186 B1 | 4/2014 | Hahn et al. |
| 8,717,713 B1 | 5/2014 | Bjorstrom et al. |
| 8,797,689 B1 | 8/2014 | Pan et al. |
| 8,861,141 B2 | 10/2014 | Bjorstrom et al. |
| 8,908,332 B2 | 12/2014 | Shum et al. |
| 9,111,559 B1 | 8/2015 | Hahn et al. |
| 9,117,468 B1 | 8/2015 | Zhang et al. |
| 9,218,834 B2 | 12/2015 | Imai et al. |
| 9,224,410 B1 | 12/2015 | Ee et al. |
| 9,245,555 B2 | 1/2016 | Bennin et al. |
| 9,296,188 B1 | 3/2016 | Cray et al. |
| 9,311,938 B1 | 4/2016 | Ee et al. |
| 9,330,696 B1 | 5/2016 | Hahn et al. |
| 10,332,552 B2 | 6/2019 | Vanderlee |
| 11,501,797 B2 | 11/2022 | Ee et al. |
| 2005/0207055 A1 | 9/2005 | Oh et al. |
| 2010/0246067 A1* | 9/2010 | Fujimoto ............ G11B 5/4873 |
| 2011/0058280 A1 | 3/2011 | Hanya et al. |
| 2011/0058282 A1 | 3/2011 | Fujimoto et al. |
| 2011/0216446 A1 | 9/2011 | Iriuchijima |
| 2011/0228425 A1 | 9/2011 | Liu et al. |
| 2011/0249366 A1* | 10/2011 | Fujimoto ............ G11B 5/4873 29/25.35 |
| 2011/0292550 A1 | 12/2011 | Fujimoto |
| 2012/0087047 A1 | 4/2012 | Imuta |
| 2013/0293070 A1* | 11/2013 | Imuta .................. H10N 30/88 310/348 |
| 2013/0301164 A1 | 11/2013 | Nishida et al. |
| 2013/0314821 A1 | 11/2013 | Arai |
| 2015/0055255 A1 | 2/2015 | Bennin et al. |
| 2015/0213818 A1 | 7/2015 | Imai et al. |
| 2015/0348577 A1 | 12/2015 | Hagiya et al. |
| 2017/0330589 A1 | 11/2017 | Bjorstrom et al. |
| 2018/0198057 A1 | 7/2018 | Hahn et al. |
| 2019/0295574 A1 | 9/2019 | Hahn et al. |
| 2019/0311734 A1 | 10/2019 | Hahn et al. |
| 2021/0358518 A1* | 11/2021 | Ee ........................ G11B 5/4833 |
| 2023/0015787 A1* | 1/2023 | Ee ........................ G11B 5/4826 |

OTHER PUBLICATIONS

International Preliminary Report on Patentability in International Application No. PCT/US2021/032590, dated Nov. 24, 2022.
Office Action in U.S. Appl. No. 17/320,038, dated Sep. 8, 2021.
Office Action in U.S. Appl. No. 17/320,038, dated Mar. 16, 2022.
Office Action in U.S. Appl. No. 17/320,038, dated May 10, 2022.
Notice of Allowance in U.S. Appl. No. 17/320,038, dated Aug. 15, 2022.
Notice of Allowance in Japanese Application No. 2022-563441, dated May 9, 2023.
Substantive Examination Report in Philippines Application No. 1-2021-553037, dated Oct. 13, 2023.

* cited by examiner

Proximal End                    Distal End

ACTUATOR JOINT WITH NON-STRAIGHT EDGE

CROSS-REFERENCE TO RELATED APPLICATIONS

This application is a continuation of U.S. patent application Ser. No. 17/320,038 filed on May 13, 2021, which claims the benefit of U.S. Provisional Application No. 63/025,788 filed on Mar. 15, 2020, which is hereby incorporated by reference in its entirety.

FIELD

This disclosure relates to the field of suspensions for hard disk drives. More particularly, this disclosure relates to the field of actuator joints on an actuated suspension configured to provide enhanced stiffness.

BACKGROUND

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk which is referred to as the "fly height."

Head suspensions for rigid disk drives include a load beam and a flexure. The load beam typically includes a mounting region for mounting the head suspension to an actuator of the disk drive, a rigid region, and a spring region between the mounting region and the rigid region. The spring region provides a spring force to counteract the aerodynamic lift force generated on the head slider during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

In some examples, the flexure is formed as a separate piece having a load beam mounting region which is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam, or gram load, to the flexure, provides clearance between the flexure and the load beam, and functions as a point about which the head slider can gimbal in pitch and roll directions to follow fluctuations in the disk surface.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track. Attempts to improve this situation have included the provision of a another or secondary actuator or actuators, such as a piezoelectric, electrostatic or electromagnetic actuator or fine tracking motor, mounted on the head suspension itself. These types of actuators are also known as second-stage microactuation devices and may be located at the base plate, the load beam or on the flexure.

Some of these attempts to improve tracking and head slider positioning control have included locating the actuator at the head slider itself. Typically, this type of actuator is sandwiched between the head slider and the head slider mounting surface of the flexure or other suspension component or is otherwise directly coupled to the head slider. Movement of the actuator then generally results in relatively direct movement of the head slider to provide the desired fine motion of the read/write head over the tracks of the disk drive.

One problem with this type of set up is shock robustness, especially in the piezoelectric configurations. In these configurations, the amount of shock able to be withstood is limited by the fracture limit of the piezoelectric material because much of the shock load passes through the piezoelectric element. Making the piezoelectric element thicker, wider or shorter will increase the shock robustness by increasing the stiffness of the element, but these changes will also result in a decrease in the amount of stroke provided by the element. Increases in shock robustness without losing stroke capability would be advantageous.

SUMMARY

A suspension is described. The suspension includes a base plate and a load beam coupled to the base plate. The base plate includes a distal elongated element and a proximal elongated element. The distal elongated element includes at least one non-straight baseplate edge and the proximal elongated element includes at least one non-straight baseplate edge. The load beam includes a first mounting shelf and a second mounting shelf. The load beam is coupled to the base plate such that the first mounting shelf is exposed adjacent to the distal elongated element, and the second mounting shelf is exposed adjacent to the proximal elongated element. The first and second mounting shelves are configured to receive an actuator, such that an edge of the actuator and the at least one non-straight baseplate edge forms a gap.

In some examples of the suspension, the gap is filled with a first adhesive, the first adhesive is either a non-conductive adhesive or a conductive adhesive. The non-straight baseplate edge enables enhanced tolerance for placement of the actuator and dispensing of the first adhesive. Either of the non-straight baseplate edges can include at least one straight base plate edge portion and at least one concave portion.

A base plate device is also provided. The base plate device includes a distal elongated element including at least one non-straight baseplate edge. The base plate device also includes a proximal elongated element separated by the distal elongated element by an actuator receiving space. In some examples, the proximal elongated element includes at least one non-straight baseplate edge.

In some examples of the base plate device, the non-straight baseplate edge can be configured to account for placement capability of the actuator and dispensing capability of the first adhesive. Either of the non-straight baseplate edges can include at least one straight base plate edge portion and at least one concave portion.

A suspension device is also provided. The suspension device includes a gimbal assembly. The gimbal assembly includes an actuator mounted on the suspension device with a fixed end and a hinge end, opposite the fixed end. The gimbal assembly also includes a first electrode on a top surface of the actuator. A second electrode is located on a bottom surface of the actuator. The second electrode is coupled to a conductive layer on the suspension device via conductive adhesive. The gimbal assembly also includes a metal base layer located at the hinge end. The metal base layer includes a non-straight metal layer edge configured to create a gap between an edge of the actuator and the metal layer. The gap is configured to receive non-conductive adhesive to reduce the possibility of and or prevent an electrical short between the conductive adhesive and the metal base layer.

In some examples of the suspension, the non-straight edge of the metal base layer includes at least one straight edge portion and at least one concave portion. The conductive layer can be a copper layer. The metal base layer includes a stainless-steel layer.

A gimbal assembly is also provided. The gimbal assembly includes an actuator mounted on the suspension device with a fixed end and a hinge end, opposite the fixed end. The gimbal assembly also includes a first electrode on a top surface of the actuator. A second electrode is located on a bottom surface of the actuator. The second electrode is coupled to a conductive layer on the suspension device via conductive adhesive. The gimbal assembly also includes a metal base layer located at the hinge end. The metal base layer includes a non-straight metal layer edge configured to create a gap between an edge of the actuator and the metal layer. The gap is configured to receive non-conductive adhesive to reduce the possibility of an electrical short between the conductive adhesive and the metal base layer.

In some examples of the gimbal assembly, the non-straight edge of the metal base layer includes at least one straight edge portion and at least one concave portion.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

DETAILED DESCRIPTION

Figure 1:
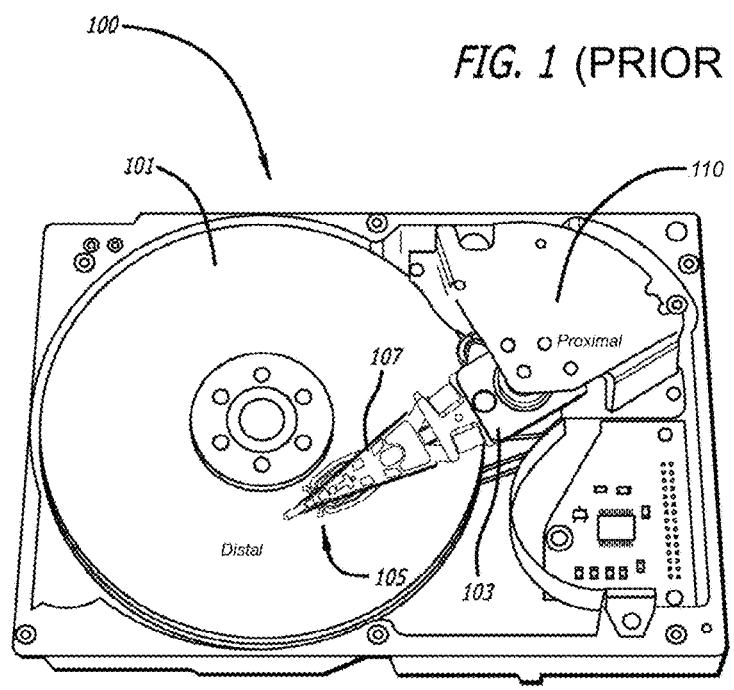
FIG. 1 is a top perspective view of a prior art magnetic disk drive unit.

FIG. 1 is a top perspective view of a magnetic disk drive unit 100. The disk drive unit 100 includes a spinning magnetic disk 101, which contains a pattern of magnetic ones and zeroes on it that constitutes the data stored on the disk drive. The magnetic disk 101 is driven by a drive motor. The disk drive unit 100 further includes a suspension 105 to which a magnetic head slider is mounted proximate the distal end of load beam 107. The "proximal" end of a suspension or load beam is the end that is supported, i.e., the end nearest to a base plate which is swaged or otherwise mounted to an actuator arm. The "distal" end of a suspension or load beam is the end that is opposite the proximal end, i.e., the "distal" end is the cantilevered end.

The suspension 105 is coupled to an actuator arm 103, which in turn is coupled to a voice coil motor 110. The voice coil motor 110 is configured to move the suspension 105 arcuately in order to position the head slider over the correct data track on the magnetic disk 101. The head slider is carried on a gimbal (not shown), which allows the slider to pitch and roll so that it follows the proper data track on the spinning magnetic disk 101, allowing for such variations without degraded performance. Such variations typically include vibrations of the disk, inertial events such as bumping, and irregularities in the disk's surface.

Figure 2:
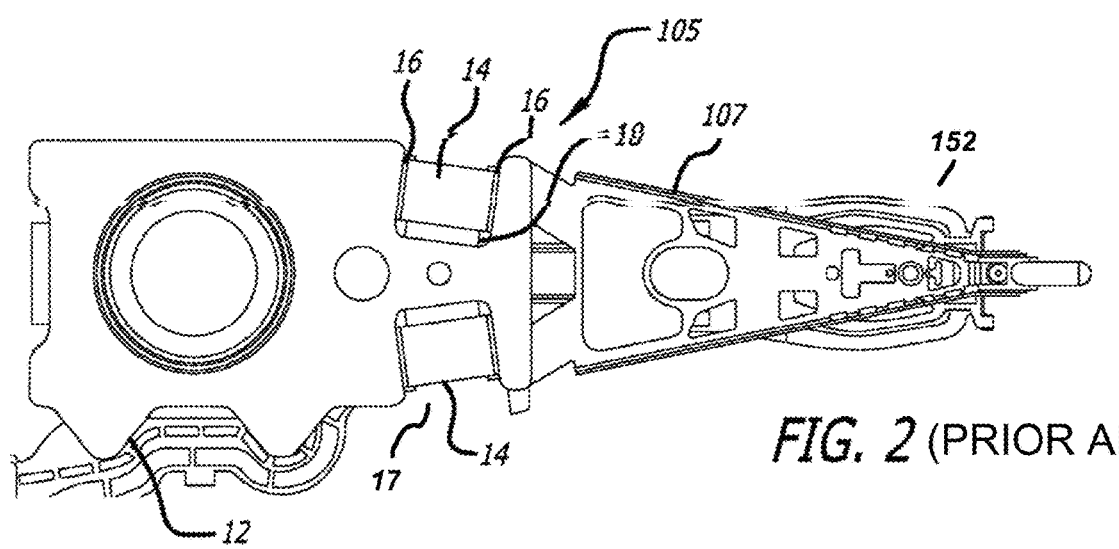
FIG. 2 is a top plan view of the suspension of the disk drive of FIG. 1.

FIG. 2 is a top plan view of a suspension 105 in FIG. 1. The suspension 105 can include a base plate 12, and a load beam 107. The load beam 107 includes a trace gimbal 152. The trace gimbal 152 can include mounted actuators and a gimbal assembly (not shown). The actuators are operable to act directly on the gimbaled area of the suspension 105 that holds the read/write head slider.

The base plate 12 can include at least one actuator joint 17 configured to receive an actuator 14. The base plate 12 illustrates two actuator joints 17, located on opposing sides of the base plate 12. Each actuator joint 17 includes actuator mounting shelves 18, formed within load beam 107. For example, the actuator mounting shelves 18 can extend from the load beam 107 in a unibody configuration.

Each actuator 14 spans the respective gap in the actuator joint 17. The actuators 14 are affixed to the mounting shelves 18 by an adhesive. The adhesive can include conductive or non-conductive epoxy 16 strategically applied at each end of the actuators. The positive and negative electrical connections can be made from the actuators 14 to the suspension's 105 flexible wiring trace and/or to the plate by a variety of techniques. When the actuator 14 is activated, it expands or contracts producing fine movements of the read/write head that is mounted at the distal end of suspension 105 thereby changing the length of the gap between the mounting shelves 18.

The suspension 105 can be configured as a single-stage actuation suspension, a dual-stage actuation device, or a tri-stage actuation device. Conceivably, any variation of actuators can be incorporated onto the suspension 105 for the purposes of the examples disclosed herein. In other words, the suspension 105 may include more or less components than those shown without departing from the scope of the present disclosure. The components shown, however, are sufficient to disclose an illustrative example for practicing the disclosed principles.

Figure 3:
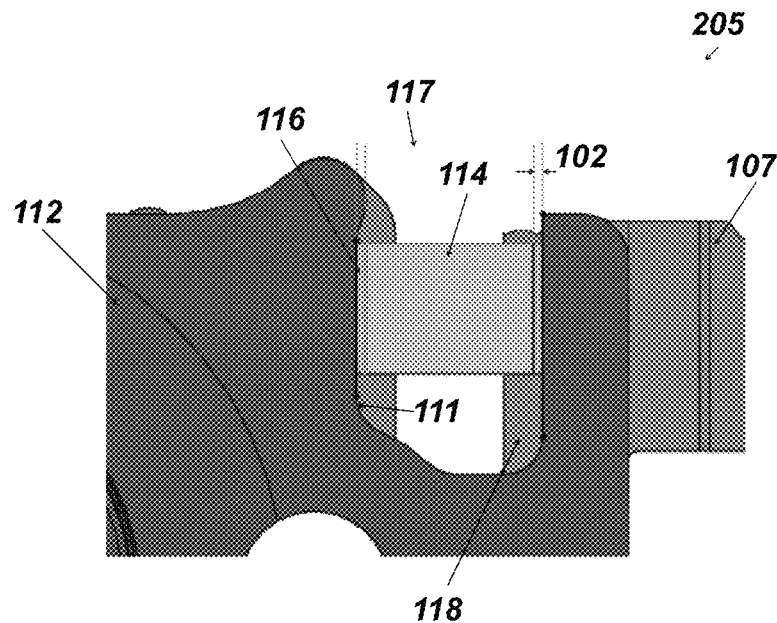
FIG. 3 illustrates an actuator joint of a suspension, according to an example of this disclosure.

FIG. 3 illustrates an actuator joint 117 of a suspension 205, according to an example of this disclosure. The suspension 205 includes a base plate 112 and a load beam 107. The load beam 107 can include mounting shelves 118. The base plate 112 can include two extending sections with opposing base plate edges 111. The mounting shelves 118 can be exposed between base plate edges 111 such that the distance between opposing edges of the mounting shelves 118 is narrower than the distance between the base plate edges 111. The actuator joint 117 is positioned between the base plate 112 and the load beam 107. The actuator 114 is received at the actuator joint 117 between two base plate edges 111 and resting on mounting shelves 118 of the load beam 107. The actuator 114 is separated from one of the two base plate edges 111 by a gap 102. The dimension of the gap 102 is configured to account for various manufacturing factors, such as, for example actuator 114 placement capability, adhesive 116 dispensing capability, and other manufacturing tolerances. In some manufacturing processes, the adhesive 116 is first dispensed on the mounting shelves 118 before the actuator 114 is positioned and placed within the actuator joint 117.

Figure 4:
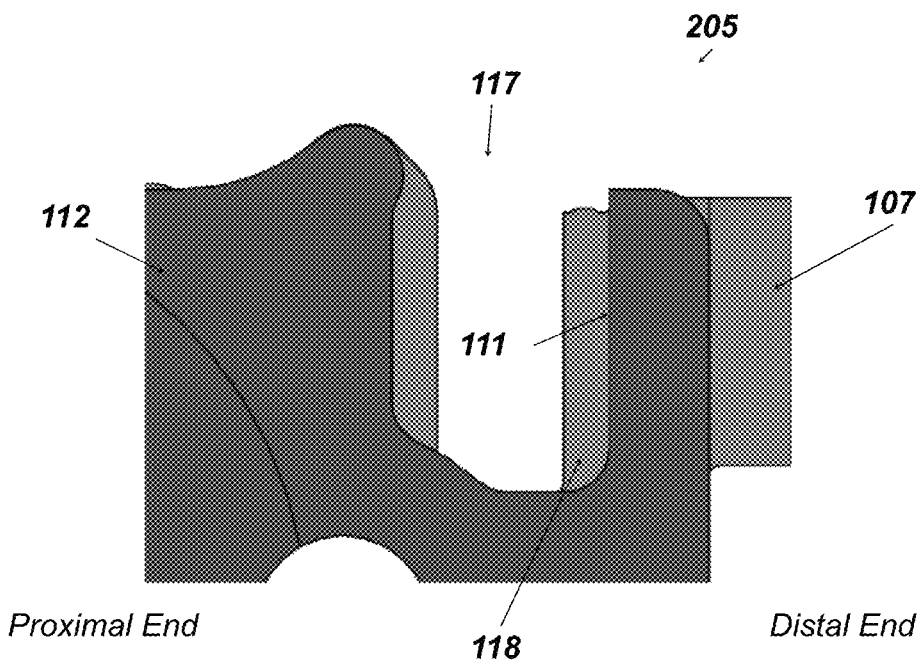
FIG. 4 illustrates an actuator joint of FIG. 3 without the actuator, according to an example of this disclosure.

The dimension of the gap 102 between the actuator 114 and one of the two base plate edges 111 is also configured to account for the stiffness of the actuator joint 117. It has been determined, a smaller gap 102 and thus an actuator 114 with a larger cross section is preferred in order to enhance the stiffness of the suspension 205, due to the reduction in adhesive. FIG. 4 illustrates the actuator joint 117 without the actuator. Table 1 provides example gaps with varying dimensions and the associated suspension performance.

TABLE 1

| Gap | stroke (nm/V) | Sway freq. (kHz) |
|---|---|---|
| 50 um | 12.4 | 21.6 |
| 100 um | 11.4 | 20.8 |

Table 1 illustrates nominal gap dimensions, which are generally limited to manufacturing capability, such as adhesive dispensing and spread control. Gaps with small dimensions (<100 um) increases the chance of adhesive 116 overflow towards the load beam 107 opening as shown in FIG. 3. The present disclosure illustrates additional examples of actuator joints configured to reduce the chance of adhesive 116 overflow, while providing enhanced stiffness.

Figure 5A:
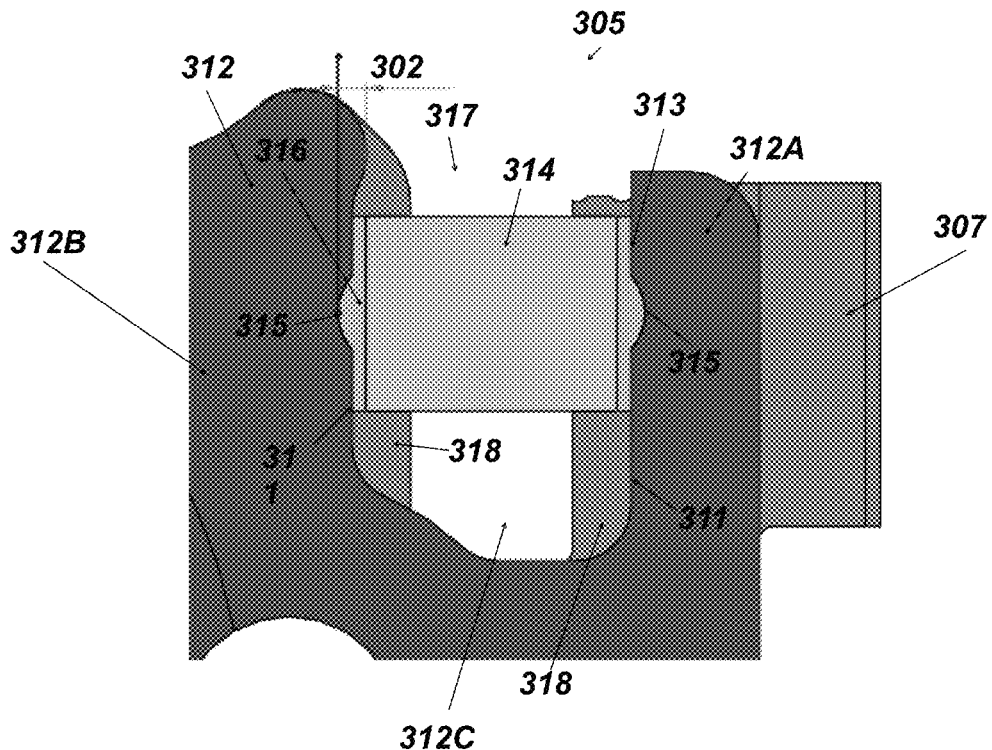
FIG. 5A illustrates an actuator joint of a suspension, according to an example of this disclosure.

FIG. 5A illustrates an actuator joint 317 of a suspension 305, according to an example of this disclosure. The suspension 305 includes a base plate 312 and a load beam 307. The base plate 312 includes a distal elongated element 312A and a proximal elongated element 312B. The distal elongated element 312A and the proximal elongated element 312B can be separated by an actuator receiving space 312C. The load beam 307 includes mounting shelves 318, a first mounting shelf 318A is coupled to the distal elongated element 312A and a second mounting shelf 318B is coupled to the proximal elongated element 312B. An actuator 314 is received at the actuator joint 317 between the distal elongated element 312A and the proximal elongated element 312B of the base plate 312 and resting on the mounting shelves 318 of the load beam 307.

The actuator joint 317 is formed between the distal elongated element 312A and the proximal elongated element 312B of the base plate 312 and the mounting shelves 318 of the load beam 307. The distal elongated element 312A of the base plate 312 can be configured with a non-straight baseplate edge 311 for the actuator joint 317.

The proximal elongated element 312B is also configured with a non-straight baseplate edge 311. For example a non-straight edge includes one or more non-straight elements, such as, for example, concave portions, convex portions, sloped portions, warped portions, or a portion incongruent with another section of the edge. A concave edge portion 315 is illustrated herein as centrally located along the non-straight baseplate edge 311. The concave edge portion 315 can be dimensionally configured to reduce adhesive 316 overflow. Furthermore, the actuator joint 317 can be configured such that the non-straight baseplate edge 311 includes at least one straight base plate edge portion 313 adjacent to the concave edge portion 315.

In some examples, the concave edge portion 315 is centered along an edge of the actuator 314. The actuator joint 317 also includes a gap 302 between actuator 314 edge and the non-straight baseplate edge 311 to provide enhanced stiffness, as shown in Table 2.

The dimension of the concave edge portion 315 is generally limited by manufacturing factors, such as, for example actuator placement capability, adhesive dispensing capability, etc. In manufacturing processes, the adhesive 316 can be first dispensed on the mounting shelves 318 before the actuator 114 is positioned and placed within the actuator joint 317.

TABLE 2

| Gap | Stroke (nm/V) | Sway freq. (kHz) |
|---|---|---|
| 50 um | 12.4 | 21.6 |
| 100 um | 11.4 | 20.8 |
| Non-straight, 100 um max | 12.1 | 21.3 |

Table 2 provides example gaps of varying dimensions, including the non-straight baseplate edge, and the stroke and sway frequency of a suspension incorporating the gap dimensions. The concave edge portion 315 can be located along the non-straight baseplate edge 311 to reduce the chance of adhesive 316 overflow.

The combination of straight and non-straight elements along the non-straight baseplate edge 311 provides a better mechanical bond for the adhesive 316 to the base plate 312. This, the straight and non-straight elements are adhesive attach enhancement features. The non-straight elements allow for a larger cross section of the adhesive, leading to an improved internal strength of the adhesive. In specific examples the adhesive's internal strength is improved at the concave edge portion 315. The overall strength of the actuator joint 317 is increased due to the increased adhesive's internal strength.

Figure 5B:
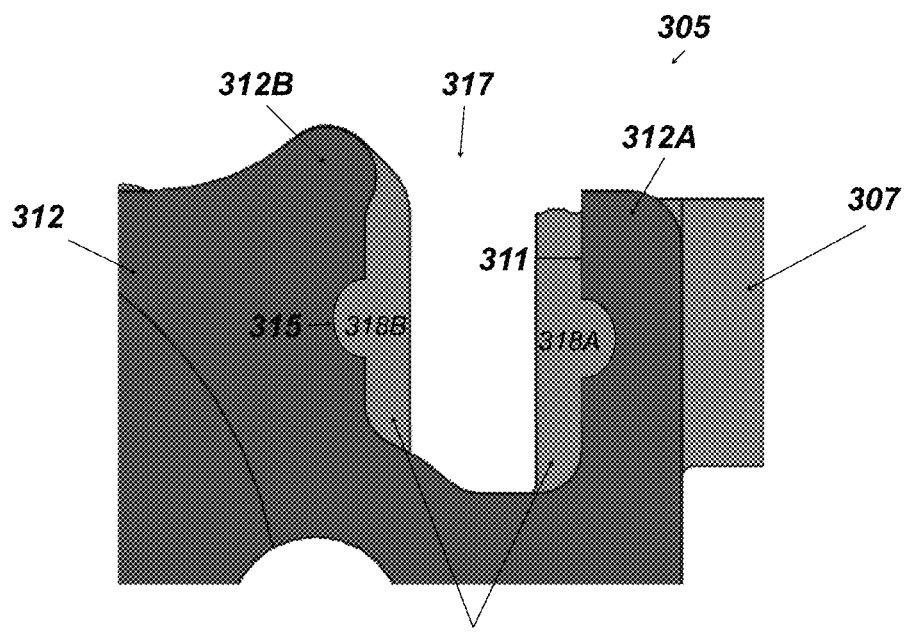
FIG. 5B illustrates the actuator joint of FIG. 5A without the actuator, according to an example of this disclosure.

FIG. 5B illustrates the actuator joint 317 without the actuator, as illustrated in FIG. 5A. The adhesive along the straight elements of the non-straight baseplate edge 311 protrudes from between the actuator and the baseplate, with adhesive overflowing onto a bottom surface of the actuator when attached. While the adhesive overflow has traditionally been used to enable additional mechanical strength to the actuator joint, the adhesive overflow can short out the actuator 314 if they contain conductive particles and extend up to the top conductive surface.

Traditionally, more adhesive was desired to reduce the likelihood of an incomplete bond pad condition. As the adhesive volume is increased to ensure a complete bond pad, the number of potentially rejected adhesive overflows is also increased. The reduced adhesive volume would cause an increase in incomplete bond pads. The present disclosure allows for more tolerance in applying adhesive to ensure completed bond pads while reducing adhesive overflows. Specifically, the non-straight baseplate edge is configured to receive an adhesive volume that would have previously been tolerable as adhesive overflow.

A maximum height tolerance of the adhesive overflow is specified for production of the disclosed components to achieve additional mechanical strength. The present disclosure allows for more tolerance in applying adhesive to ensure the maximum height tolerance of the adhesive overflow isn't met for each component. The dimensions of the gap provides additional mechanical strength that was previously achieved from the adhesive overflow.

The present disclosure seeks to reduce the instances of adhesive overflow in favor of the adhesive attach enhancement features disclosed herein. The additional strength enabled by the adhesive attach enhancement features counters the loss of strength seen from eliminating or reducing the adhesive overflow.

Figure 6:
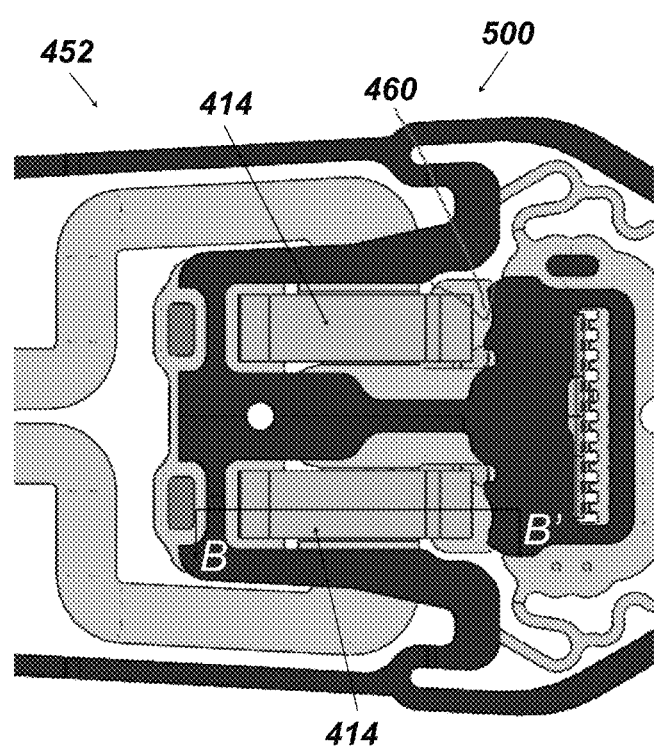
FIG. 6 illustrates gimbal of a suspension, according to an example of this disclosure.
Figure 7:
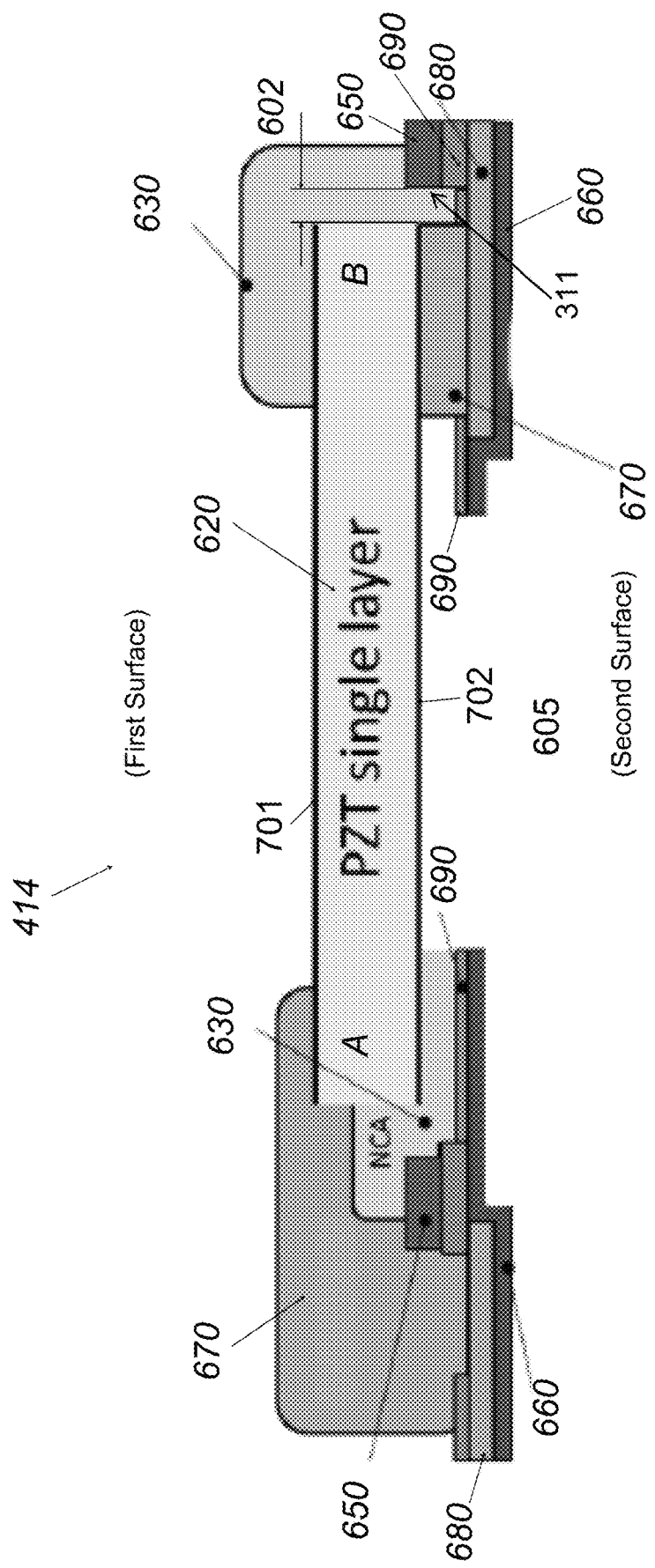
FIG. 7 is cross-sectional view of the actuator area of FIG. 6 taken along section line B-B'.

FIG. 6 illustrates a first surface of a gimbal assembly 452 of a suspension 500, incorporating an example non-straight edge actuator joint 460. FIG. 7 is cross-sectional view of the actuator 414 area of FIG. 6 taken along section line B-B'. Referring to FIG. 7, the actuator 414 spans across a receiving area 605. An actuator 414 is illustrated with a fixed end A and a hinge end B. Each end of the actuator 414 is bonded to the gimbal assembly 452 (of FIG. 6).

The actuator 414 includes a first electrode 701 on a top surface of the actuator 414, and a second electrode 702 on a bottom surface of the actuator 414. The hinge end B of the actuator 414 area includes a cover layer 660, and a conductive layer 680 (e.g., copper), an insulating layer 690 (e.g., polyimide), and a metal base layer 650 (e.g., stainless-steel). The second electrode 702 is electrically coupled to the conductive layer 680 via a conductive adhesive 670. The metal base layer 650 can be configured to incorporate a non-straight stainless-steel edge, for example the non-straight baseplate edge 311 described with reference to FIG. 5A. The non-straight stainless-steel edge enables a gap 602. The gap 602 reduces the chance of electrical shorting between the conductive adhesive 670 and the metal base layer 650. A non-conductive adhesive 630 is applied to fill the gap 602.

At the fixed end A, the first electrode 701 is electrically coupled to the conductive layer 680 via a conductive adhesive 670. The top and bottom electrodes are separated at the fixed end A by the non-conductive adhesive 630.

While multiple examples are disclosed, still other examples within the scope of the present disclosure will become apparent to those skilled in the art from the detailed description provided herein, which shows and describes illustrative examples. Accordingly, the drawings and detailed description are to be regarded as illustrative in nature and not restrictive. Features and modifications of the various examples are discussed herein and shown in the drawings. While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

What is claimed is:

1. A suspension comprising:
a base plate including a distal elongated element and a proximal elongated element, the distal elongated element including one baseplate edge and the proximal elongated element including one baseplate edge, at least one of the baseplate edge of the distal elongated element and the baseplate edge of the proximal elongated element includes a concave portion located near an upper surface of an actuator to reduce adhesion overflow; and
a load beam coupled to the base plate such that a first mounting shelf is exposed adjacent to the distal elongated element, and a second mounting shelf is exposed adjacent to the proximal elongated element, the first mounting shelf comprising a portion extending into a receiving portion of the distal elongated element and the second mounting shelf comprising a portion extending into a receiving portion of the proximal elongated element, the first mounting shelf and the second mounting shelf are configured to receive the actuator, such that an edge of the actuator and the baseplate edge forms a gap, and
wherein the gap is configured to receive a first adhesive, the first adhesive is either a non-conductive adhesive or a conductive adhesive.

2. The suspension of claim 1, wherein the baseplate edge enables enhanced tolerance for placement of the actuator and dispensing of the first adhesive.

3. The suspension of claim 1, wherein the baseplate edge of the distal elongated element includes at least one straight base plate edge portion.

4. The suspension of claim 1, wherein the baseplate edge of the proximal elongated element includes at least one straight base plate edge portion.

5. A base plate comprising:
a distal elongated element including one baseplate edge; and
a proximal elongated element separated by the distal elongated element by an actuator receiving space, the proximal elongated element including one baseplate edge, and at least one of the baseplate edge of the distal elongated element and the baseplate edge of the proximal elongated element includes a concave portion located near an upper surface of an actuator to reduce adhesion overflow, and wherein the distal elongated element comprises a receiving portion formed within the distal elongated element and the proximal elongated element comprises a receiving portion formed within the proximal elongated element.

6. The base plate of claim 5, wherein the baseplate edge of the distal elongated element includes at least one straight base plate edge portion.

7. The base plate of claim 5, wherein the baseplate edge of the proximal elongated element includes at least one straight base plate edge portion.

* * * * *